Oct. 6, 1936.   C. A. HAMMOND   2,056,318
RADIATOR AND MOUNTING
Filed June 7, 1935   4 Sheets-Sheet 1

Oct. 6, 1936.  C. A. HAMMOND  2,056,318
RADIATOR AND MOUNTING
Filed June 7, 1935   4 Sheets-Sheet 2

Charles A. Hammond
By Pope & Pope
Attorneys

Oct. 6, 1936.  C. A. HAMMOND  2,056,318
RADIATOR AND MOUNTING
Filed June 7, 1935  4 Sheets-Sheet 3

Oct. 6, 1936.   C. A. HAMMOND   2,056,318
RADIATOR AND MOUNTING
Filed June 7, 1935   4 Sheets—Sheet 4

Patented Oct. 6, 1936

2,056,318

UNITED STATES PATENT OFFICE 2,056,318

RADIATOR AND MOUNTING

Charles A. Hammond, Lancaster, N. Y., assignor of one-tenth to Ira C. Kilbourn, Alden, N. Y.

Application June 7, 1935, Serial No. 25,404

11 Claims. (Cl. 257—130)

This invention relates to a radiator which is more particularly intended for use in cooling the water of the engines of automobiles which are operated by explosive fuel such as gasoline, but the radiator is also capable of use in other installations where similar conditions exist.

In radiators of this type as heretofore constructed most of the parts entering into the composition of the same are connected with each other by means of soldering, brazing, welding or similar operations, all of which are very expensive and not only involve a waste of material such as solder, but also is uncertain and unreliable in its effect inasmuch as testing of such radiators after being fabricated discloses a great deal of leakage and insecure connection between some of the parts, which necessitates repairing and patching before the radiator is water-tight and can be put into service.

The principal object of the present invention is to provide a radiator of this character in which no soldering, welding or brazing is employed for connecting any of the parts thereof, excepting the connection between the radiator core and the upper and lower water boxes or headers, but instead the several parts of the core and the connection between the radiator and the supporting frame or mounting are effected by mechanical means under pressure, so that the respective parts are reliably connected and are incapable of separating while in use and the joints between the several parts are also securely sealed so as to prevent leakage of any water from the radiator.

A further object of this invention is to provide simple and efficient means of an improved character for mounting the radiator on an automobile or other support intended to receive the same.

In the accompanying drawings:

Figure 8 is a fragmentary rear elevation of the radiator and its mounting embodying my improvements.

Figure 9 is a fragmentary horizontal section taken on line 9—9 Fig. 8.

Fig. 10 is a fragmentary perspective view of a partially formed sheet metal blank from which a plurality of water tubes are made as part of the radiator embodying my improvements.

Figure 11 is a similar view showing the blank for making a plurality of water tubes in accordance with my invention progressed beyond the form shown in Fig. 10.

Figure 12 is a similar view showing the formation of a plurality of water tubes from a sheet of metal, progressed still farther as compared with Fig. 11, and in a nearly completed condition.

Figure 13 is a perspective view of one of the sealing, coupling or locking bars used in connection with the sheet of metal which has been converted into a plurality of water tubes for the purpose of sealing a joint and preventing the escape of water from one of the water boxes or headers to the exterior of the radiator.

Figure 14 is a fragmentary perspective view showing a sheet metal blank partially formed for the production of a plurality of radiating fins for use in connection with a plurality of water tubes in accordance with my invention.

Figure 15 is a similar view showing a sheet metal blank for making a plurality of radiating fins progressed beyond the formation which is shown in Fig. 14.

Figure 16 is a similar view showing one of the preferred forms of sealing, coupling or locking bars which are employed in accordance with my invention for connecting parts of the radiating fins which embrace the water tubes and retain the same in their operative position on these tubes.

Figure 17 is a fragmentary perspective view of the preferred form of means for sealing the longitudinal joints of the water tubes and also connecting parts of the radiating fins and holding the same in an assembled relation to the water tubes, in accordance with my invention.

Figures 18 and 19 are fragmentary sections similar to Fig. 9, showing modified forms of the means for connecting the radiating fins at one of the longitudinal edges thereof, adjacent to one edge of a water tube.

In its general organization this radiator comprises a central cellular core 50 which in the present case is provided with a plurality of upright water tubes 51 and a plurality of horizontal air passages 52, an upper header or water box 53 which communicates on its underside with the upper ends of the water tubes 51 and receives the water from the engine which is to be cooled through a pipe 54 opening into the rear wall of this header, a lower water box or header 55 having its upper side communicating with the lower ends of the water tubes 51 and returning the cooling water to the engine through a discharge pipe 56 which opens through the rear wall of this last-mentioned header, and a mounting or frame 57 which surrounds the radiator and is adapted to be mounted upon the chassis of an automobile or other part where the radiator is to be installed.

Figure 1:
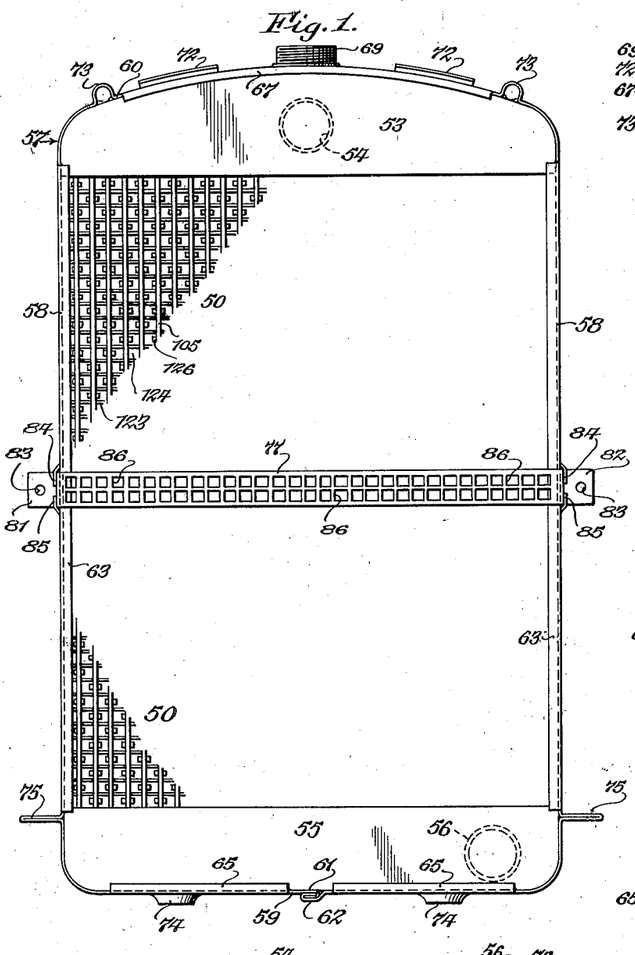
Figure 1 is a front elevation of a radiator embodying my improvements.
Figure 2:
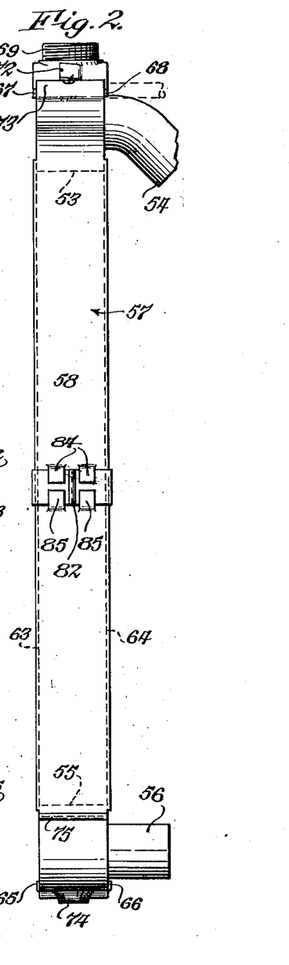
Figure 2 is a side elevation of the same.
Figure 3:
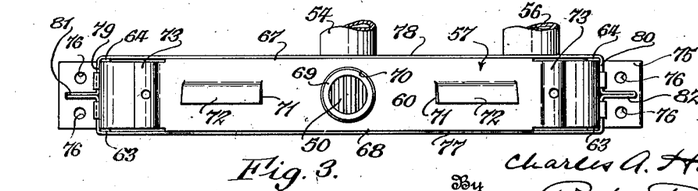
Figure 3 is a top plan view thereof.

The mounting or frame of the radiator comprises upright sheet metal straps or bars 58 which engage with the opposite vertical ends of the radiator core and upper and lower water boxes or headers, a lower strap or bar 59 connecting the lower ends of the side bars 58 and engaging with the underside of the lower water box, and an upper sheet metal strap or bar 60 connected at its opposite ends with the upper ends of the side bars 58 and engaging with the top of the upper water box or header 53, as shown in Figs. 1, 2, and 3.

These several frame bars or straps are made from one continuous strip of sheet metal, the ends of which are preferably arranged centrally on the underside of the lower water box and mechanically connected with each other without the use of solder, by providing these ends with hooks 61, 62 which engage with one another and are securely connected by closing these hooks under pressure so that they are firmly interlocked, and the frame bars are held on the radiator core and boxes without the use of any solder for this purpose.

The radiator is confined within the bars of this frame by providing the upright bar of the frame with vertical inwardly projecting flanges 63, 64 at the front and rear edges of this bar and engaging with the front and rear sides of the adjacent part of the radiator core and the upper and lower water boxes, front and rear flanges 65, 66 projecting upwardly from the front and rear edges of the lower frame bar 59 and engaging with the adjacent parts of the front and rear sides of the lower water box 55, and front and rear flanges 67, 68 projecting downwardly from the front and rear edges of the upper cross bar 60 of the supporting frame and engaging with the adjacent parts of the front and rear sides of the upper water box 53. By this means the radiator core and its water boxes are held against forward and backward displacement in the supporting frame or mounting, without the use of any solder or equivalent means for this purpose, inasmuch as each of these bars is U-shaped in cross section and embraces the adjacent part of the radiator.

The filling neck 69 which is arranged on the upper side of the upper water box and through which the same is replenished with water, projects upwardly from the top of the respective water box through an opening 70 in the central part of the upper frame cross bar 60. On opposite sides of this filling neck the upper frame cross bar 63 is provided with radiating openings 71 which expose a part of the upper side of the upper water box, and from the rear edge of these openings a baffle, flange or lip 72 projects upwardly and forwardly so as to intercept air flowing backwardly over the radiator and directs the same against the top of the water box for the purpose of aiding in cooling the same.

Beyond the air opening 71 and adjacent to opposite ends of the upper frame or mounting bar 60 the latter is provided with two upwardly projecting loops 73 which are adapted to receive tie bars, rods or similar elements whereby the radiator frame or mounting is connected with the chassis or other available part of the automobile on which the radiator is to be supported.

On its underside and opposite the center thereof the lower frame cross bar 59 is provided with two bosses 74, 74 which are adapted to receive bolts, screws or similar fastening means for connecting the lower part of the mounting or supporting frame with an adjacent part of the automobile chassis.

Adjacent to their lower ends each of the upright bars of the mounting is provided with a laterally projecting lug 75 which is preferably produced by folding a part of the metal of the respective mounting side bar outwardly, and this lug is adapted to rest upon an adjacent part of the chassis and to be secured thereto by means of a pair of bolts passing through openings 76 in this lug, or by any other suitable means.

For the purpose of holding the central parts of the upright frame bars 58 reliably in engagement with opposite edges of the radiator a transverse tie is provided which preferably comprises horizontal front and rear bars 77, 78 of sheet metal extending across the central parts of the core on the front and rear sides thereof, two end bars 79, 80, each of which connects one of the corresponding ends of the front and rear bars 77 and 78 and engages with the central part of the outer side of one of the upright bars 58, and attaching lugs 81, 82 projecting laterally outward from the central parts of the end bars 79, 80 respectively, and adapted to be fastened to any available part of the chassis by any suitable means, for example by bolts or screws passing through openings 83 formed in these lugs.

These several bars 77, 78, 79, 80 and the lugs 81, 82 are preferably constructed from a single strip of sheet metal which embraces the radiator core and the adjacent parts of the upright frame bars 58, and has the central part of the side bar 80 doubled so as to form the supporting lug 82, while the opposite ends of this strap are bent laterally outward and held in engagement with each other and with the part of the chassis by the bolt or screw passing through the opening of this lug.

Vertical displacement of this transverse tie is prevented by means of upper and lower retaining lips 84, 85 which are stamped out of each frame side bar 58 and overlap the upper and lower edge portions of the side bars 79 and 80, as shown in Figs. 1, 2, and 3.

In order to conform the cross bar 77, 78 of the transverse frame tie to the radiator core and also avoid obstructing the movement of air through the air passages of the radiator core, each of these cross bars is provided with a plurality of openings 86 which are of the same shape and location as the air passages or cells of the radiator core, for example square, as shown in Fig. 1, and thereby not only maintain the uniform appearance of the radiator and its mounting when viewed from the front, but also maintaining the maximum cooling efficiency of the same.

In accordance with my invention a plurality of the water tubes of the core are formed from a single sheet of metal of suitable thickness, the blank of which is so slitted and bent that the walls of each of these tubes are integrally connected and the walls of adjacent tubes are also integrally connected, and the longitudinal joints on one side of each of these water tubes are capable of being mechanically connected without the use of any solder or similar means. In the making of a plurality of such water tubes which embody this invention a comparatively long strip of sheet metal 87 is provided at suitable intervals in the direction of its length with longitudinal slits or slots 88 which are arranged on a longitudinal line 89 which is midway between the opposite longitudinal edges of this strip, as shown in Fig. 10, and the longitudinal edges of this strip are also provided transversely in line with each of the several slits with elongated notches 90, 91, each pair of which is equal in length with the companion central slit 88.

Figures 8, 9, 10, 11, 12, 13, 14, 15, 16, 17, 18:
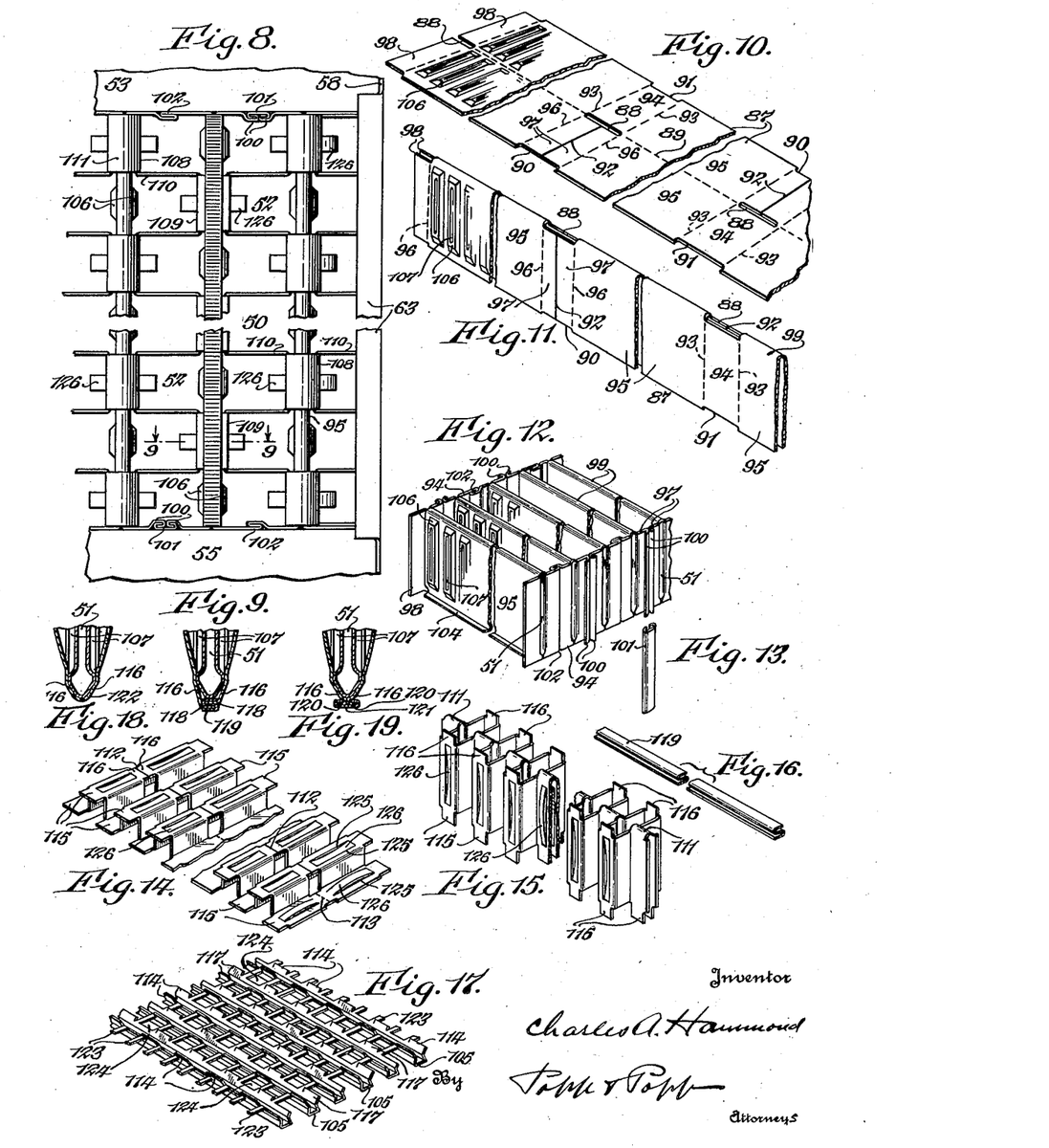

Through the length of the strip 87 the same is provided at intervals with a plurality of transverse slits 92 which are arranged alternately on the two halves of this strip on opposite sides of the central line 89 thereof, and each of these transverse slits extends from the central part of one of the intermediate slits 88 to the central part of one of the notches 90, while the adjacent part of that part of the strip between the opposite side of the respective slit 88 and the companion notch 91, is not slitted but remains integrally connected, as shown in Fig. 10. This strip is subjected to other operations before continuing with the manufacture of this strip, but for the present reference to the same will be omitted and only the formation of the tubes themselves will be explained.

After the blank strip 87 has been prepared in the manner described and shown in Fig. 10, this strip is bent or folded throughout its length along the central longitudinal or median line 89 so as to form two plies which are arranged parallel with each other, as shown in Fig. 11. This doubled longitudinal strip is now folded in opposite directions on transverse lines 93 which extend from opposite ends of each central slit 88 to opposite ends of each marginal notch 91 in the strip, so as to form a whole web 94 on each half of the strip 87 between these transverse lines 93, and also bring the parts 95 of each ply of the strip which are on longitudinally opposite sides of the whole web 94, in parallelism with each other, so that each forms one side wall of a water tube which is spaced apart from a corresponding wall of an adjacent water tube.

The middle of each ply of the doubled or folded strip 87, shown in Fig. 11, is also bent on transverse lines 96 which extend across this ply of sheet metal at each end of the slot 88 and on opposite sides of each of the slits in this ply which are arranged intermediate of the opposite ends of the strip 87 so as to form two half webs 97 on opposite sides of each transverse slit 92, and also two half webs 98 at each of the corresponding edges of the two plies at one end of the blank.

One end of a water tube wall 95 after being thus bent transversely along a transverse line 96 relative to the respective wall, will have its transverse edge arranged opposite the transverse edge of a corresponding half web 97 on the corresponding end of the opposing wall of an adjacent water tube. When the folding of the tube blank has progressed to this stage, as shown diagrammatically in Figs. 20 and 21, a plurality of parallel partially completed water tubes are formed, each of which is substantially U-shaped in cross section, and has its two side walls 95 integrally connected at one of its corresponding longitudinal edges by a longitudinal web 99, while the opposite longitudinal edges of the walls of this tube are free and not integrally connected.

Figure 20:
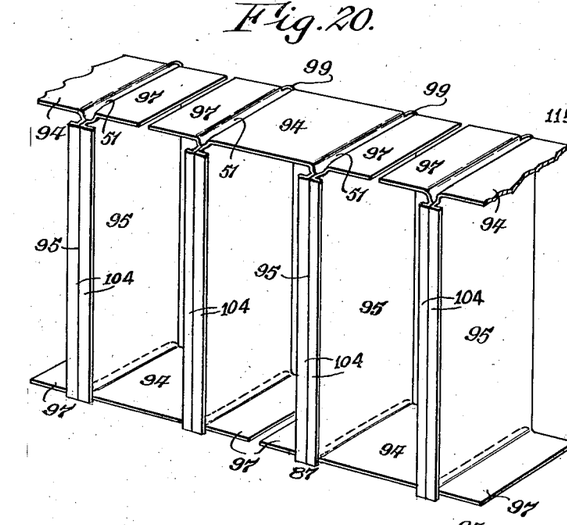
Figure 20 is a diagrammatic perspective view showing one of the steps whereby a plurality of water tubes are made from a single sheet of metal in accordance with my invention, this view being taken from that side of the water tube walls where the longitudinal edges of the walls are not integrally connected.
Figure 21:
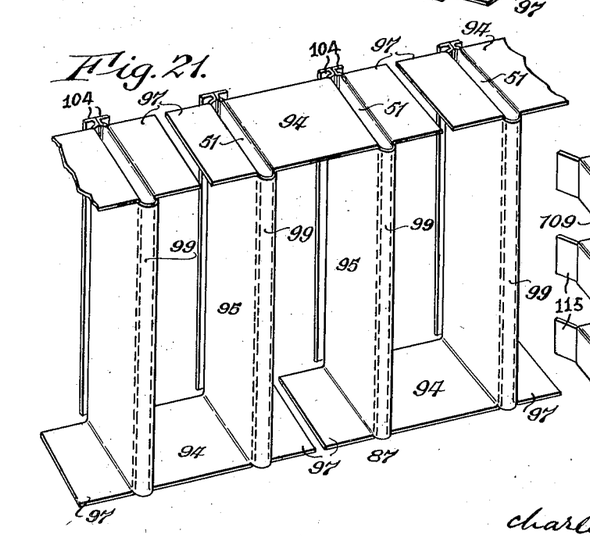
Figure 21 is a view similar to Fig. 20 taken from the opposite side thereof where the longitudinal edges of the walls of each water tube are integrally connected.

These figures also show diagrammatically that one transverse end of each side wall of a water tube is integrally connected with the opposing wall of an adjacent water tube at the corresponding end of the latter by the whole web 94, while the opposite transverse ends of the walls of these two tubes have their half webs 97 opposing each other but not integrally connected, and thereby form a space between adjacent water tubes through which air is adapted to pass for carrying off the heat in the water as it flows through the water tubes from one header or water box to another, and thus effect a transfer of heat.

When the tube blank has reached this stage the whole web 94 and the half webs 97 are alternately arranged at opposite ends of the air spaces between the several pairs of water tube walls, as best shown in Figs. 20 and 21, and subsequently the companion half webs of adjacent water tubes are connected with each other so as to complete the closure at the respective end of the air space between adjacent water tubes, and the non-integral or free longitudinal edges of each pair of water tube walls are also connected with each other so as to complete the formation of these tubes.

Figure 4:
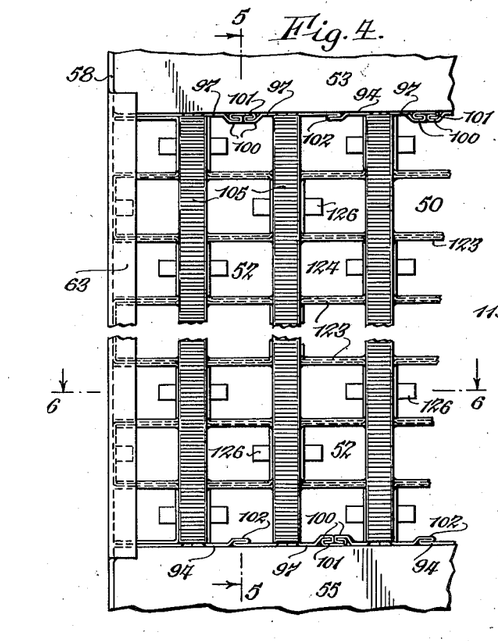
Figure 4 is a fragmentary front elevation, on an enlarged scale, of the radiator and its mounting.
Figure 7:
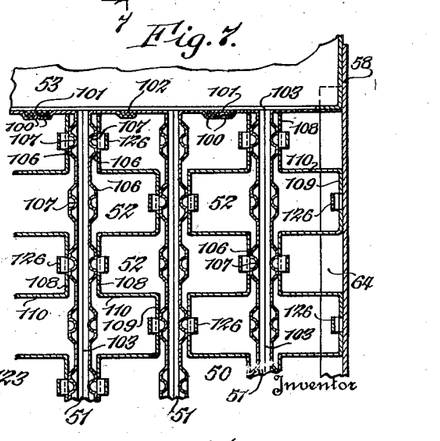
Figure 7 is a fragmentary vertical section taken on line 7—7 Fig. 5.

Various means may be employed for connecting the opposing transverse edges of each pair of half webs 97, but this is preferably effected by means which do not require the use of any solder, and may be accomplished by providing the transverse edge of each of the half webs 97 with a hook-shaped flange 100, as best shown in Fig. 12, and then coupling these hook-shaped flanges of adjacent half webs by means of a coupling, sealing or connecting bar 101 which is of C-shaped form in cross section, as shown in Fig. 13, by assembling this bar with said flanges so that the latter engage with the channels of this bar, as best shown in Figs. 4, 7, and 8.

The coupling bar 101 is preferably made of comparatively stiff metal, such as brass, while the metal from which the water tubes are made preferably consists of a softer metal, such as thin copper, whereby the coupling bar 101 after being engaged with the hook flanges 100 and then pressing or rolling these members together, a tight seam or joint will be produced between the same which will effectively prevent leakage of water without the use of soldering or similar operation.

In the formation of the hook flanges 100 on the opposing edges of the half webs 97 a reduction in the width of the space between the opposing walls of two adjacent water tubes is effected, and it is therefore necessary for the purpose of maintaining the respective water tube walls in parallelism, to take out the slack metal which is present in the whole web which connects the respective water tube walls at the opposite end of the air space between them. This slack is preferably taken up by reversely folding the central part of the metal of each whole web in a direction transversely of the respective ply of sheet metal, as shown at 102 in Figs. 4, 8, and 12.

Although any suitable means may be employed for closing the joint between the non-integral longitudinal edges of each pair of water tube walls, this is preferably effected by means which are of a mechanical character and do not require the use of any soldering or similar operation. The preferred means for accomplishing this purpose also serve as part of the means for connecting the heat radiating fins to the water tubes, and a full description of these means will therefore be deferred until these radiating means have been sufficiently described.

Figure 6:
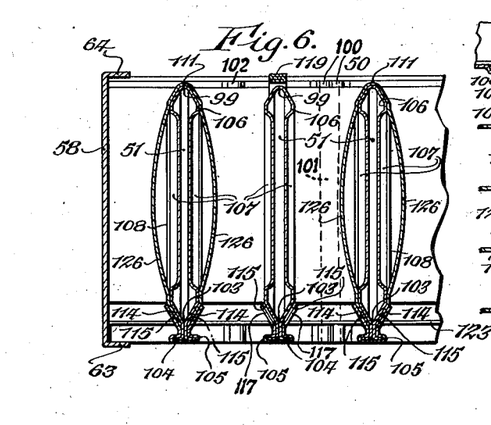
Figure 6 is a horizontal section taken on line 6—6 Fig. 4.

For the present it will be sufficient to state that in the completed form the non-integral longitudinal edges of the walls of each water tube are bent toward each other and engaged with one another, as shown at 103 in Fig. 6, and each of these edges is provided with an outwardly projecting coupling flange 104 which is also shown in Fig. 12.

The non-integral longitudinal edges of the walls of each water tube are connected by means of coupling bars 105 which are C-shaped in cross section, as shown in Fig. 6, and as there shown the flanges 104 of the respective water tube walls are engaged with internal channels respectively, of the C-shaped coupling bar 105, and after thus engaged these parts are firmly pressed or rolled together so as to form a tight seam or joint between the same which will effectively prevent the leakage of water through this joint. Each of the coupling bars 105 is preferably made of brass or other hard material, so that when pressed or closed against the flanges 104 of the water tube walls which are made of comparatively soft copper, this joint will remain closed and not open under normal usage or conditions.

For the purpose of increasing the turbulence of the water as it passes lengthwise through the water tubes, and also to cause the air upon passing through the air passages between the water tubes to be intercepted and deflected so as to increase the transfer of heat from the water in the tubes to the air on the exterior thereof, each of the water tube walls is provided with a vertical row of lateral offsets which at intervals increase the cross-sectional area of each water tube and also at intervals form obstructions or deflecting surfaces in the air passages.

This effect is preferably accomplished by providing each water tube wall at intervals throughout the height thereof with a main horizontal bead 106 which projects outwardly from the main plane of this wall into the adjacent air space, and extends transversely of this wall from the front end to the rear end thereof. On the summit of each of these main beads the same is provided with a reversely bent auxiliary bead 107 which projects inwardly into line with the plane of the respective water tube wall, as shown in Figs. 5, 6, 7, 9, and 12. By this means a greater area of contact with the water and with the air is provided on each water tube wall which, in addition to the increased turbulence in the water and the agitation of the air, produces a more effective and rapid transfer of heat from the water to the air, thereby increasing the heat transfer capacity of the radiator accordingly.

This radiator core may be connected with the upper and lower water boxes or headers in any suitable manner, but for convenience in repairing the same solder may be used for connecting the upper ends of the water tubes and the adjacent parts of the whole webs and half webs with the respective sides of the water boxes or headers, this being the only instance in which solder is used for the purpose of completing this radiator.

Various means may be employed for increasing the radiation of heat from the exterior of the water tubes to the air which flows through the air spaces between these walls, but it is preferable to employ for this purpose the means which are embodied in my invention and which are constructed as follows:

Upon each alternate water tube is mounted a radiating element which is provided with parts projecting laterally therefrom toward adjacent alternating water tubes which do not carry a radiating element but are nevertheless in contact therewith, so that all the water tubes are provided with means for transferring heat from the water to the air.

Figure 22:
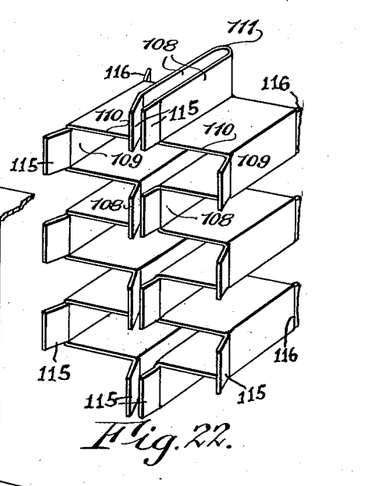
Figure 22 is a diagrammatic perspective view showing one of the steps in the manufacture of a plurality of radiating fins from a single sheet of metal, in accordance with my invention, this view being taken from that side of the radiating fins where the longitudinal edges of the same are not integrally connected.
Figure 23:
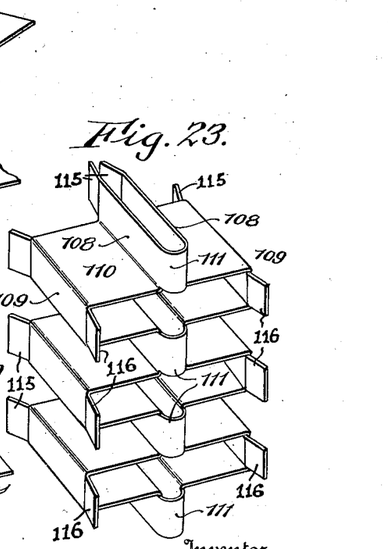
Figure 23 is a view similar to Fig. 22 but taken from the opposite side of the radiating fins where the adjacent members are integrally connected.

Each of the radiating elements is constructed from a single sheet of thin metal, such as copper, so as to form two plies or fins which are arranged on opposite outer flat sides of the two walls of the water tube. Each of these fins is bent into zig-zag form so as to provide a plurality of flat valleys 108, a plurality of flat summits 109 which are offset from the valleys and alternate therewith, and a plurality of transverse webs 110, each of which connects one of the longitudinal edges of one of the summits with a longitudinal edge of an adjacent valley 108, so that each fin presents a zig-zag appearance which is corrugated in the direction of its length, as shown in Figs. 7, 22, and 23.

The valleys of each radiating fin engage with the summits of the main deflecting beads of a water tube wall on one side of an air space, and the summits of this fin engage with the main beads of the water tube wall on the opposite side of this air space, whereby each of these air spaces is divided into a plurality of air passages which extend from the front side to the rear side of the radiator core, and each of which is substantially square in cross section.

One of the corresponding vertical or longitudinal edges of each of the two fins which are formed from a single sheet of metal, is integrally connected by means of an end web 111, and the opposite free vertical longitudinal edges of these valleys are connected by mechanical means, as will hereinafter appear, whereby the two fins of each radiating element which are made from a single sheet of metal are mounted on one of the water tubes so as to embrace the same tightly and thus operate most efficiently for radiating heat from the water to the air.

Each of the radiating elements which ultimately provides two radiating fins, is made from a single sheet of metal which during one stage of its operation is bent so as to provide two fins, each of which is of zig-zag form, and at this stage of its manufacture the valleys of the two fins are all arranged in one plane, and all the summits of both fins are arranged in another plane, as shown in Fig. 14.

The adjacent ends of the summits of both fins are divided by means of transverse slits 112 and the opposing ends of the valleys of both fins are integrally connected along a longitudinal line 113.

During a subsequent stage in the manufacture of two fins from a single sheet of metal the two fins are bent and folded transversely relatively to each other along the longitudinal line 113 so as to form the longitudinal integral webs 111 and space the valleys of the two fins from each other, so that the same can be engaged with opposite sides of the walls of a water tube. When a pair of fins are thus engaged with a water tube the vertical webs 111 engage with the integral web 99 at one of the longitudinal edges of the water tube walls, while the opposite free longitudinal edges of the valleys 108 are bent toward each other and engage with the outer sides of the non-integral longitudinal edge portions of the respective water tube walls, as shown in Fig. 6.

The radiating fins are retained in this position by means of retaining lips 114 arranged on alternate coupling bars 105 and engage with the outer sides of the free longitudinal edge portions of the valleys of the two companion fins, as shown in Fig. 6. These longitudinal edge portions of the fins are preferably so constructed that they converge outwardly and the retaining lips 114 are of corresponding form, as shown in Fig. 6, thereby facilitating the assemblage of these parts and reducing the cost of manufacture.

Figure 5:
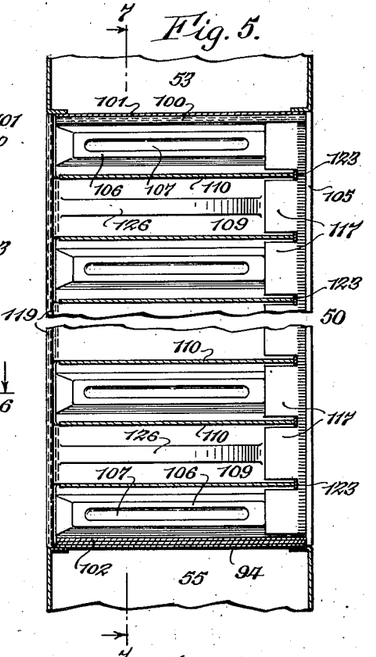
Figure 5 is a vertical section taken on line 5—5 Fig. 4.

Each of the summits is provided at its opposite ends with lips or tabs 115, 116 which engage with opposite sides of the vertical edges of the alternating water tubes which are not embraced or engaged by the valleys of the radiating fins. The lips or tabs 115 are arranged on opposite sides of the free or non-integral edges of the water tube which is not embraced by fins and these tabs are engaged by retaining lips 117 on the respective C-shaped coupling bar 105 for the purpose of holding the respective radiating fins of two radiating elements on opposite sides of an intervening water tube, as shown at the bottom of Fig. 6. The retaining lips or tabs 116 at the rear ends of the summits engage with opposite sides of the closed or integrally connected longitudinal edge of a water tube which is not embraced by the pair of fins of a radiating unit, as shown in Fig. 9. The companion fins 116 of two radiating elements may be connected with each other mechanically in various ways, but as shown in Fig. 5, this is accomplished by providing each of the lips 116 with flanges 118 which overlap each other and engage with oppositely opening channels of a locking bar 119 which is S-shaped in cross section, as shown in Figs. 9 and 16. This locking bar is made of brass or other hard material so that when it is closed tightly by means of pressing or rolling, it will retain a firm grip on the flanges 118 and prevent the radiating fins, of which they form a part, from becoming detached.

Instead of employing a locking bar of S-shaped form in cross section, as shown in Figs. 9 and 16, for connecting the lips or tabs 116, these lips may be arranged transversely in line with each other, as shown at 120 in Fig. 19, and engaged with the two channels of a coupling bar 121 which is of C-shaped form in cross section, as shown in Fig. 13.

If desired these lips of the fins may be merely bent against the integrally connected edges of the water tube, as shown at 122 in Fig. 18.

In the preferred construction a plurality of coupling bars 105 are made from a single sheet of metal so that these bars can be manipulated and applied to the water tubes and air radiating fins easily, conveniently and economically in the manufacture of the radiator core, and for this purpose adjacent flanges of these bars are connected by transverse webs or cross bars 123 which are preferably arranged at intervals in rows between adjacent sealing or coupling bars and so spaced that each of these webs is arranged in line with one of the webs 110 of the several radiating fins, whereby these bars and connecting webs together form an open-work grill which upon being applied to the respective edges of the water tubes and radiating fins provides a plurality of openings 124 which register with the air cells or passages between the water tubes and radiating fins and thus permit free flow of air through the radiator core. This grill-shaped multiple coupling member is preferably applied to the front side of the radiator core and thereby gives the same a finished appearance.

Each of the summits and the valleys of the several radiating fins is preferably so constructed that the adjacent water tube wall or other metal part of the core with which it engages is uncovered so as to increase the area thereof which can be contacted by the air for the purpose of increasing the radiating efficiency of the core, which means are also preferably so constructed that they act as a baffle or obstructing means within the air passages and cause the air to be deflected within the air passages toward the water heated surfaces and thereby further increase the heat radiating effect.

The preferred means for this purpose consists in providing each summit and each valley of a radiator fin with a pair of transverse slits 125 and displacing the metal between such slits inwardly toward the respective air space so as to produce an inwardly offset baffle or deflecting member, as shown at 126 in Figs. 4, 6, 7, 8, 14, and 15.

As the air flows through the cells of the radiator core the same picks up heat from the walls of the water tubes which are exposed on the open sides of the corrugations of the radiating fins, also from the radiating fins which absorb heat from the water tube walls, and also from those parts of the water tube walls which are exposed to the air underneath the deflectors or baffles 126, thereby materially increasing the transference of heat.

In the preferred construction the summits and valleys of each radiating fin engage their outer surfaces with the summits of alternate radiating beads 106 on the opposing walls of two adjacent water tubes so that each of the deflectors or baffles 126 is arranged over the respective auxiliary bead 107 of the main bead 106 which is thus engaged, as best shown in Fig. 7, thereby obtaining the maximum efficiency of the increased area which is provided by these auxiliary beads. The summits of the radiating fins at the opposite lateral extremities of the core merely engage with the solid bars 58 of the radiator mounting or frame, as shown in Figs. 4 and 7.

In my invention the water tubes are made from sheet metal which is bent into form, and the several parts are mechanically connected without the use of any solder or similar connecting medium, thereby not only effecting a saving in cost but also producing a radiator core which is much stronger and not liable to develop any leaks under the severest use to which radiators of this character are subjected.

I claim as my invention:—

1. A core for radiators comprising a plurality of water tubes and a plurality of air conduits between adjacent water tubes, each of said water tubes having two spaced longitudinal walls which are integrally connected at one of their corresponding longitudinal edges and mechanically connected at their opposite corresponding longitudinal edges, and each water tube wall having one of its ends connected by an integral whole web with the corresponding end of the wall of an adjacent water tube and the opposite end of each water tube wall having a laterally projecting half web which is mechanically connected with a half web projecting laterally from the corresponding end of the wall of an adjacent water tube wall.

2. A core for radiators comprising a plurality of water tubes and a plurality of air conduits between adjacent water tubes, each of said water tubes having two spaced longitudinal walls which are integrally connected at one of their corresponding longitudinal edges and mechanically connected at their opposite corresponding longitudinal edges, and each water tube wall having one of its ends connected by an integral whole web with the corresponding end of the wall of an adjacent water tube, and the opposite end of each water tube wall having a laterally projecting half web which is mechanically connected with a half web projecting laterally from the corresponding end of the wall of an adjacent water tube wall, said water tube walls, webs and flanges being formed from a sheet of metal which is folded along a longitudinal line to form two plies, and provided at intervals along said longitudinal line with longitudinal slits, and with transverse slits formed alternately on opposite sides of said longitudinal line and each transverse slit extending from the central part of one of said longitudinal slits to the corresponding longitudinal edge of said sheet, and said sheet being bent on transverse lines at the ends of each of said longitudinal slots for bringing said tubes side by side and forming said whole webs and half webs between adjacent tubes.

3. A core for radiators comprising a plurality of water tubes and a plurality of air conduits between adjacent water tubes, each of said water tubes having two spaced longitudinal walls which are integrally connected at one of their corresponding longitudinal edges and mechanically connected at their opposite corresponding longitudinal edges, and each water tube wall having one of its ends connected by an integral whole web with the corresponding end of the wall of an adjacent water tube and the opposite end of each water tube wall having a laterally projecting half web which is mechanically connected with a half web projecting laterally from the corresponding end of the wall of an adjacent water tube wall, each of said integral webs being provided with a fold for reducing its width and each pair of half webs being provided with hook flanges on the opposing transverse edges of the respective half webs, and a coupling bar of C-shape cross section which receives in its channels the hook flanges of said half webs.

4. A core for radiators comprising a plurality of water tubes and a plurality of air conduits between adjacent water tubes, each of said water tubes having two spaced longitudinal walls which are integrally connected at one of their corresponding longitudinal edges and mechanically connected at their opposite corresponding longitudinal edges, and each water tube wall having one of its ends connected by an integral whole web with the corresponding end of the wall of an adjacent water tube, and the opposite end of each water tube wall having a laterally projecting half web which is mechanically connected with a half web projecting laterally from the corresponding end of the wall of an adjacent water tube wall, each of said integral webs being folded for reducing the width of the same.

5. A core for radiators comprising a plurality of water tubes and a plurality of air conduits between adjacent water tubes, each of said water tubes having two spaced longitudinal walls which are integrally connected at one of their corresponding longitudinal edges and mechanically connected at their opposite corresponding longitudinal edges, and each water tube wall having one of its ends connected by an integral whole web with the corresponding end of the wall of an adjacent water tube, and the opposite end of each water tube wall having a laterally projecting half web which is mechanically connected with a half web projecting laterally from the corresponding end of the wall of an adjacent water tube wall, each of said mechanical connections between a pair of half webs consisting of hook flanges formed on the opposing transverse edges of the respective half webs, and a coupling bar of C-shaped cross section, the channels of which receive the hook flanges of said half webs.

6. A radiator comprising a plurality of water tubes each of which has two side walls of which one pair of corresponding longitudinal edges are integrally connected, while the opposite longitudinal edges of the same are free, a radiating element comprising a plurality of pairs of radiating fins, the members of each pair being arranged on opposite sides of each water tube and having one of their corresponding longitudinal edges integrally connected while their opposite longitudinal edges are free and arranged adjacent to the free edges of the respective water tube walls, said free edges of the water tube walls and said free edges of the fins having laterally projecting flanges, a coupling member substantially C-shaped in cross section having its channels engaged by the flanges of said water tube walls and radiating fins, and inclined retaining lips arranged on opposite sides of said coupling member and engaging the outer sides of said radiating fins.

7. A radiator comprising a plurality of water tubes each of which has two side walls, of which one pair of corresponding longitudinal edges are integrally connected, while the opposite longitudinal edges of the same are free, a radiating element comprising a plurality of pairs of radiating fins, the members of each pair being arranged on opposite sides of each water tube and having one of their corresponding longitudinal edges integrally connected while their opposite longitudinal edges are free and arranged adjacent to the free edges of the respective water tube walls, and means for connecting the free edges of said water tube walls and radiating fins, comprising C-shaped coupling bars each of which embraces the free edges of the pair of walls of one water tube and the free edges of the pair of radiating fins adjacent to the respective tube, and a plurality of webs connecting a longitudinal edge of each coupling member with a corresponding edge of an adjacent coupling member.

8. A radiator comprising a plurality of parallel water tubes, and a plurality of radiating elements each of which comprises a pair of radiating fins which are integrally connected at one of their longitudinal edges, a pair of said fins embracing alternate water tubes while the other alternate water tubes are not embraced by such fins, each of said fins being of zig-zag form and spanning the space between a fin embraced water tube and a non-fin embraced water tube, coupling lips arranged on the opposite ends of the salient parts of said fins and adjacent to opposite edges of said water tubes, means for coupling the lips of said fins on opposite sides of each fin-embraced tube and each non-fin embraced tube.

9. A radiator comprising a plurality of parallel water tubes, and a plurality of radiating elements each of which comprises a pair of radiating fins which are integrally connected at one of their longitudinal edges, a pair of said fins embracing alternate water tubes while the other alternate water tubes are not embraced by such fins, each of said fins being of zig-zag form and spanning the space between a fin embraced water tube and a non-fin embraced water tube, coupling lips arranged on the opposite ends of the salient parts of said fins and adjacent to opposite edges of said water tubes, means for coupling the lips of said fins on opposite sides of each fin embraced tube and each non-fin embraced tube, and consisting of a plurality of coupling bars which are S-shaped in cross section and each of which is adapted to receive in the channels on its opposite sides the coupling lips on its opposite side of one edge of each water tube.

10. A radiator comprising a plurality of water tubes made from a single sheet of metal which is bent transversely at intervals throughout its length to form tubes, each of which has two walls connected integrally at one of their corresponding longitudinal edges while their opposite corresponding longitudinal edges are free, and a spacing member connecting one free edge of a wall of one tube with one free edge of a wall of another tube and formed integrally therewith.

11. A core for radiators comprising a plurality of water tubes and a plurality of air conduits between adjacent water tubes, each of said water tubes having two spaced longitudinal walls which are integrally connected at one of their corresponding longitudinal edges and mechanically connected at their opposite corresponding longitudinal edges, a whole web integrally connected at its opposite ends with the corresponding ends of two opposing walls of adjacent water tubes, and a partial web integrally connected at one end with the opposite end of one of said water tube walls while the opposite end of said partial web is mechanically connected with the corresponding end of the other of said water tube walls.

CHARLES A. HAMMOND.